United States Patent [19]

Becchi

[11] Patent Number: 5,354,457
[45] Date of Patent: Oct. 11, 1994

[54] WATER TREATMENT EQUIPMENT

[76] Inventor: Silvano Becchi, Via Augera No. 5/A - Cadelbosco, Sopra (Reggio Emilia), Italy

[21] Appl. No.: 328,253

[22] Filed: Mar. 9, 1993

[30] Foreign Application Priority Data

Mar. 23, 1992 [IT] Italy .................. RE92A000020

[51] Int. Cl.$^5$ .................................................. C02F 7/00
[52] U.S. Cl. .................................. 210/170; 210/220; 210/242.2; 261/87; 261/120
[58] Field of Search .................. 210/170, 220, 242.2, 210/747; 261/87, 120

[56] References Cited

U.S. PATENT DOCUMENTS

| | | | |
|---|---|---|---|
| 4,157,304 | 6/1979 | Molvar | 210/242.2 |
| 4,409,107 | 10/1983 | Busch | 210/242.2 |
| 4,514,343 | 4/1985 | Cramer et al. | 210/242.2 |
| 4,732,682 | 3/1988 | Rymal | 261/120 |
| 4,741,825 | 5/1988 | Schiller | 261/120 |
| 4,882,099 | 11/1989 | Durda et al. | 210/242.2 |
| 4,954,295 | 9/1990 | Durda | 261/87 |
| 5,118,450 | 6/1992 | Chiu | 210/242.2 |

FOREIGN PATENT DOCUMENTS

| | | |
|---|---|---|
| 0088850 | 9/1983 | European Pat. Off. . |
| 0562314 | 9/1993 | European Pat. Off. . |
| 3417039 | 11/1985 | Fed. Rep. of Germany . |

*Primary Examiner*—Christopher Upton
*Attorney, Agent, or Firm*—Ladas & Parry

[57] ABSTRACT

A water treatment device is disclosed which includes a floating structure that is submerged in the water to an adjustable depth and has an adjustable orientation in the vertical plane. The device supports an operative unit including a propeller driven by a submersible motor, and a decompression chamber having at least one air inlet connected to a suction pipe that emerges above the open surface of the water, the decompression chamber having an air outlet as well. The propeller is entirely outside the decompression chamber. A hub of the propeller is hollow and communicates with the outlet of the decompression chamber and with the ambient. A conventional rotation seal device ensures the seal between the hub and the fixed part of the operative unit.

7 Claims, 2 Drawing Sheets

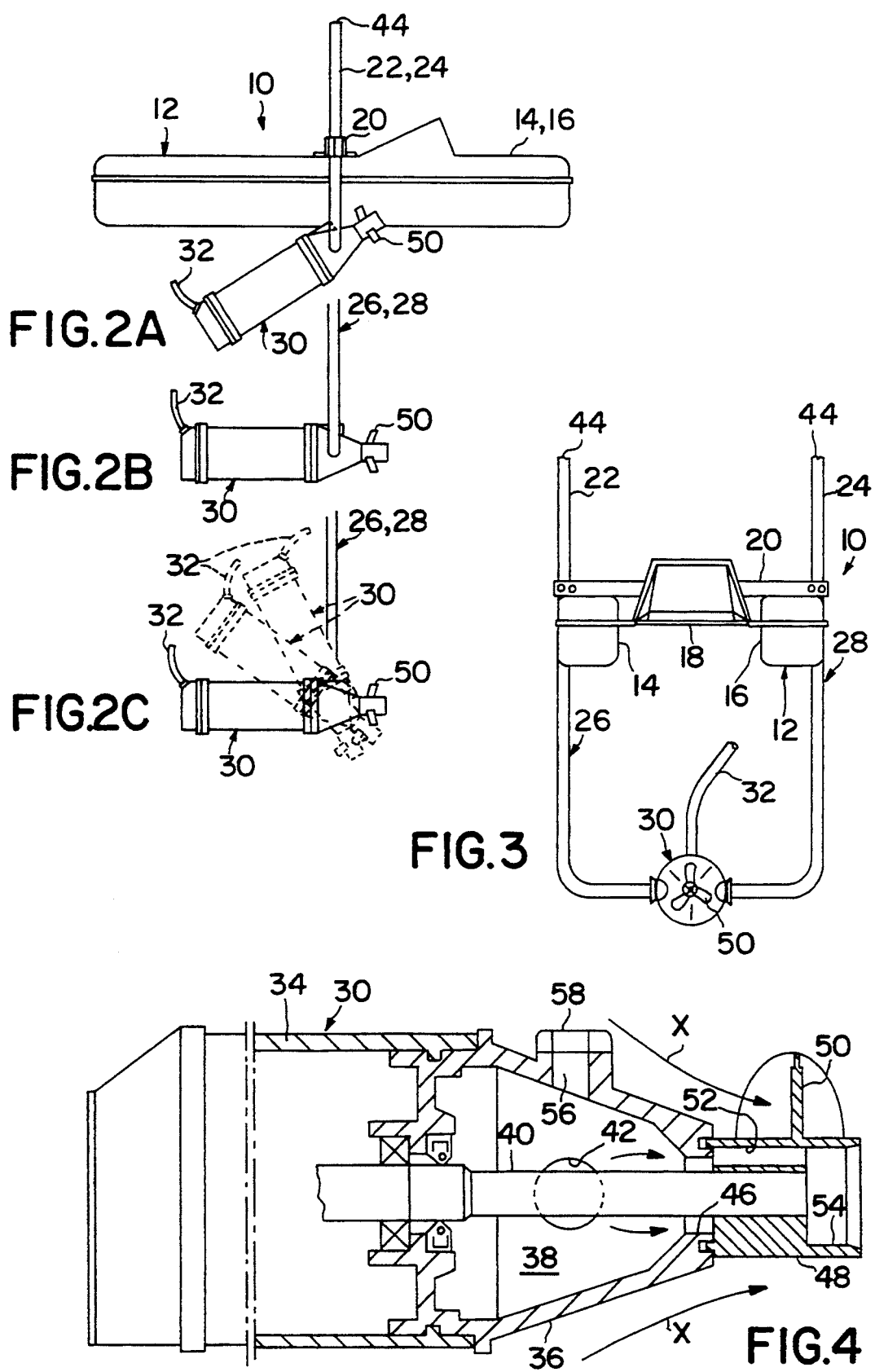

WATER TREATMENT EQUIPMENT

BACKGROUND OF THE PRIOR ART

Aeration and oxygenation equipment is well-known in the art. It is used in tanks for fish farming and aquaculture in general, in fishing basins, in aeration tanks in water treatment plants, and it is used to improve eutrophic lakes.

The purpose of this kind of equipment is to improve the state of the environment and of the water by aerating and possibly oxygenating the fish and degassing the water. These devices make the water circulate, destratify and thaw.

Thanks to such equipment it is possible, depending on the type of use, to intensify fish production while preventing diseases connected with this kind of activity and to improve the water and the environment.

The equipment currently used to carry on the above functions may be classified as follows.

PADDLE-WHEELS

Paddle-wheels are submersed in water. As they rotate, the water surface only is aerated and degassed. The circulation produced is limited, and the majority of the water is not oxygenated and destratified. Further, the paddle-wheels will not operate in places with an outside temperature lower than 0 degrees centigrade as the movement of the paddle-wheel facilitates ice formation which ultimately stops the paddle-wheel from working.

SURFACE SPLASHERS

A surface splasher is composed of an electric motor on a vertical axis with a marine-type propeller below. The device is supported by a float. The propeller pushes the water upwards. The water, however, moves back down giving rise to a characteristic mushroom-shape path of water movement. Surface splashers degas the water but aeration only occurs on the surface. Hardly any circulation of the water occurs since these devices do not normally have sufficient power to accomplish this. Since the action of these devices is localized, they cannot destratify the water and they do not prevent ice formation.

BLOWERS

Blowers are composed of a positive displacement blower, or roots supercharger, or a centrifugal blower, positioned outside of a tank. Blowers include diffusors composed of perforated pipes or microporous blocks to produce fine bubbles. Blowers use a lot of power. This results in significant noise and requires that silencers be used with the machines. Blowers require fixed pipes to distribute the blown air, and sometimes they are subject to clogging, especially those with fine bubble diffusors. Finally, blowers result in considerable installation costs.

WATER MIXERS

A water mixer is basically composed of a propeller driven by an electric motor. These units are moved by a hoist set on vertical runners fixed to the tank walls or fixed at a fixed depth, to floating structures.

The water mixer includes a chamber that undergoes a pressure drop in response to the action of the propeller. The chamber is called a decompression chamber and has a circular outlet that surrounds the near end of the propeller, and an inlet connected to a flexible air-suction pipe. The opposite end of the pipe extends above the open surface of the water. Water mixers enable good circulation and destratification of the water. However, they have limited aeration capacity, they do not degas, and some types are not able to oxygenate. Water mixers can be used on very extensive surfaces but require fixed and bulky installations, as well as involving rather high amounts of power. Finally, air brought into water mixers is not micronized.

AERATORS

An aerator consists of a floating structure that has a propeller driven by an electric motor or a combustion engine. The aerator includes a decompression chamber as noted previously as used for water mixers, with the difference being that the entire aerator except for the propeller, extends above the open surface of the basin. Therefore, an air-suction pipe is not necessary. The propeller remains just under the water surface and cannot work at any significant depth. However, the propeller can be oriented in the vertical plane, although the need to keep the propeller submersed conditions its degree of orientation. Aerators permit good circulation, destratification, and aeration, but they do not allow oxygenation, nor degassing as it is not possible to orient the propeller toward the surface. Since the motor of the aerator is positioned outside of the water, it is eventually damaged by its exposure to the atmosphere.

The above-mentioned drawbacks of the aerator limit its uses.

The present invention attempts to overcome the drawbacks of the devices just presented.

SUMMARY OF THE INVENTION

Disclosed herein is a water treatment device comprising:

a floating structure;

an operative unit comprised of a propeller and a motor, said motor acting to drive said propeller;

a decompression chamber, said decompression chamber defining an air inlet and an air outlet, said propeller being connected to but located outside of said decompression chamber; and a suction pipe attached to said air inlet and extending through and attached to said floating structure, wherein said operative unit can be adjusted in the vertical plane on said suction pipe.

The present invention performs aeration, oxygenation, degassing, circulation, destratification, and deglaciation. The invention includes a floating support structure submerged in the water at an adjustable depth and with adjustable orientation in the vertical plane. It further includes an operating unit having a propeller driven by an electric motor or by a corresponding fluidic motor, and a decompression chamber having at least one air inlet connected to a suction pipe that extends above the open surface of the water. The decompression chamber has an air outlet, characterized by the fact that the propeller is completely outside the decompression chamber. The propeller hub is hollow and communicates with the outside and with the decompression chamber outlet. A conventional rotating seal device ensures the seal between the hub and fixed part of the operative unit.

Such an apparatus enables a broad range of performance features.

If the propeller shaft is set upright, with the propeller facing upwards, just under the open surface of the tank, the device acts mainly as a surface splasher.

If the propeller shaft is tilted to the vertical (preferably by about 45 degrees), still with the propeller turned upwards and set just under the surface, the equipment aerates and degasses at the surface, with similar effects to those obtained by a paddle-wheel, but with better circulation.

If the shaft is set parallel to the surface, with the propeller still just under the surface, there is good circulation like that obtained with the noted water mixers and aerators. Additionally, deglaciation is accomplished.

If the shaft is tilted to the horizontal (for example, by 30 degrees), with the propeller turned downwards and set at a depth not far from the bottom of the basin, there is good destratification and circulation like that with the noted water mixers. Sediment is removed especially if a series of these devices are used and arranged to create a circulation of the air that oxygenates the water and permits a "controlled" evacuation of the sediment as well.

If pure oxygen, or a mixture of air and oxygen, is passed through the suction pipe of the invention, there is an oxygenation effect similar to that obtained by means of the noted water mixers fitted with a suction pipe.

In conclusion, by suitably arranging and adjusting the orientation of the present invention's propeller shaft and its depth, depending on the desired effect, it is possible to achieve all of the functions desired.

According to one aspect of this invention, the operative unit of the invention is borne through at least one support pipe by a floating structure. This support pipe also serves as a suction pipe and has one end that extends above the open surface of the water in the basin.

The invention will be better appreciated with reference to the enclosed drawings.

IN THE DRAWINGS

FIG. 2 is a side view of the invention, the operative unit being shown at three different depths.

FIG. 3 is a front view of the invention with the operative unit being set at a medium depth.

FIG. 4 is a partial, enlarged, cross-section of the operative unit taken along its longitudinal axis.

DETAILED DESCRIPTION OF THE INVENTION

Figure 1:
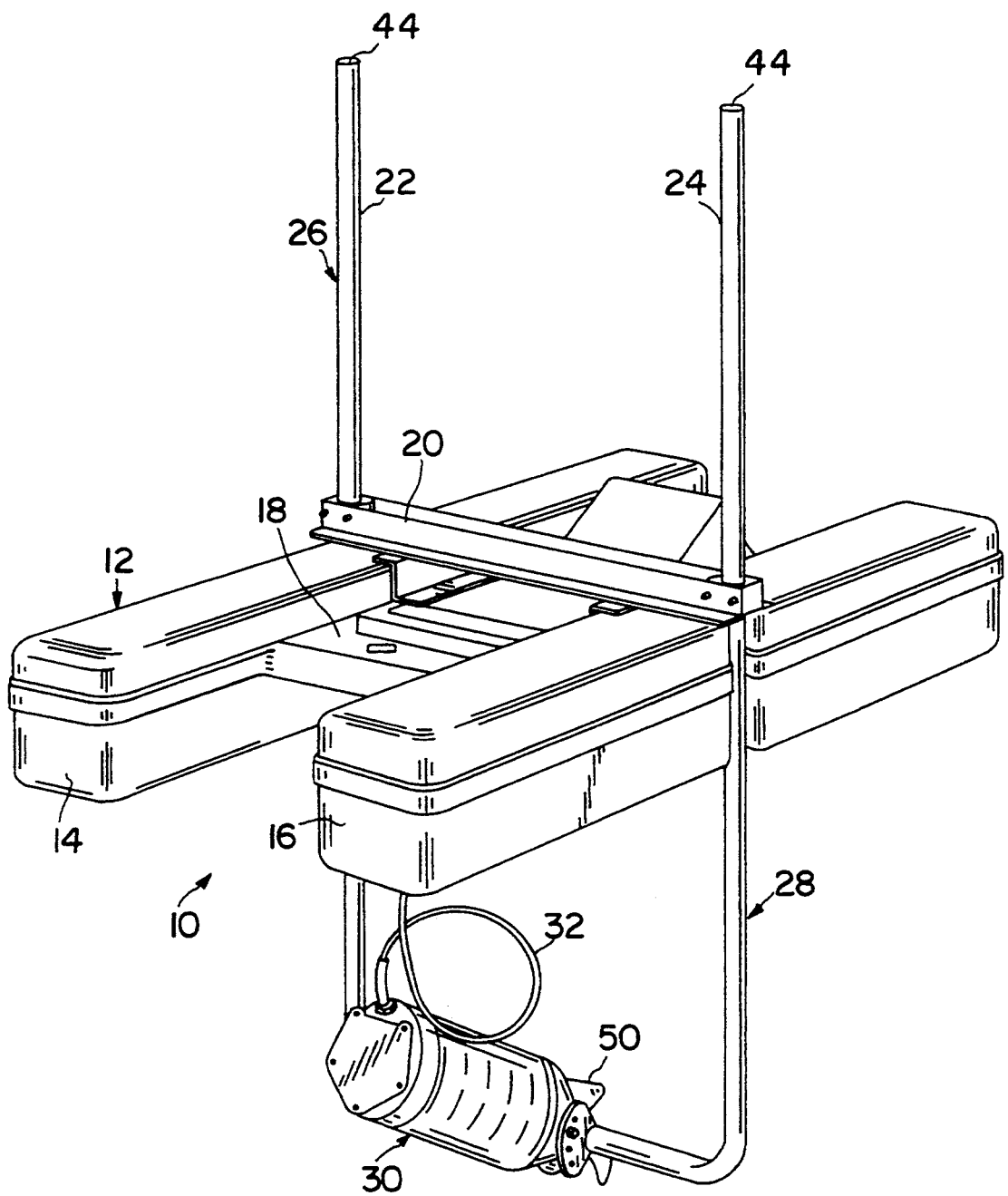
FIG. 1 is a perspective view of a water treatment device according to this invention.

Apparatus 10 is composed of a floating structure 12 comprising two plastic parallel hollow floats 14 and 16 connected to each other by a horizontal platform 18. Platform 18 is also made of plastic and is preferably manufactured in a single piece with floats 14 and 16. A metal crossbar 20 is fixed to the upper part of the floating structure 12. The two ends of the crossbar 20 have holes acting as vertical guides for the vertical arms 22 and 24 of the relative L-shaped pipes 26 and 28 to slide through. Conventional stops are used to fix these L-shaped pipes 26 and 28 in a desired position.

The length of the vertical arms 22 and 24 of the pipes 26 and 28 is determined by the maximum depth allowed by operative unit 30. Operative unit 30 revolves about the lower ends of the pipes 26 and 28 so that it may be fixedly adjusted in different angular positions in the vertical plane. The upper end 44 of the pipes 26 and 28 must in any case, extend above the water in which apparatus 10 is floating.

In FIG. 2, by way of example, there are three different positions which are indicated by letters A, B, and C.

By adjustment of arms 22 and 24 in crossbar 20, unit 30 may be brought closer to or further from floats 14 and 16. By adjustment of unit 30 with respect to the lower ends of pipes 26 and 28, unit 30 may be angled with respect to floats 14 and 16.

FIG. 3 is a front view of FIG. 2, position B.

Operative unit 30 is seen better in FIG. 4. It is composed of a cylindrical, sealing part 34 containing an electric motor (not shown) and related transmission parts. Unit 30 also includes a largely truncated cone part 36 attached to sealing part 34. The truncated cone part 36 encloses decompression chamber 38, through which crosses longitudinally a coaxial shaft 40 which is driven by the above-mentioned motor. The wall of the truncated cone part 36 is crossed by two symmetrically opposed openings 42, (FIG. 4 shows only one) that connect chamber 38 with the insides of pipes 24 and 26 respectively. The latter serve as air suction pipes as well as supports for operative unit 30.

The end of truncated cone part 36 has a circular opening 46 through which shaft 40 extends and about which there is an annular aperture. The external end of the shaft 40 has a hub 48, keyed on it and fixed to a propeller 50, which is then entirely outside chamber 38. On its inside, hub 48 has channels 52, only one of which is visible in FIG. 4. Channels 52 are equidistantly-located about the circumference and are located in parallel to shaft 40. Channels 52 connect chamber 38 through the annular aperture with the air outlet opening 54 defined in the hub 48.

There will clearly be a conventional rotating seal joint between hub 48 and truncated cone part 36 to prevent water seeping in from the outside when the propeller is rotating.

Decompression chamber 38 has another opening 56 that in FIG. 4 is closed by a nut 58. By removing nut 58, it is possible to connect opening 56 to a flexible pipe (not shown) to feed oxygen therein, or to introduce disinfectants, medicine and the like. These may be in a liquid, powder, or granular form, and will then be easily dissolved in the water contained in the basin. However, it must be clear that oxygen and the above-mentioned substances may also be introduced through the L-shaped pipes 26, 28; or the latter may merely have the function of supporting the operative-unit, so the air, too, will be sucked through the above-mentioned pipe connected to the opening 56.

The motor of the operative unit 30 runs in an oil bath, so it needs no maintenance. The materials used to build the equipment, being in contact with water, are rustproof to reduce maintenance to a minimum and to extend the service life of the apparatus as much as possible.

Operation of the equipment is very simple and should already be clear from what has been stated so far.

Running the electric motor contained in cylindrical part 34 of the operative unit 30—that may be a single- or three-phase motor, for example with a rated power of 0.6+0.9 kW, with 2800 rpm—will turn shaft 40 and consequently hub 48 and propeller 50. Propeller 50 will then move the surrounding water according to trajectories indicated diagrammatically by the arrows marked by an "x" in FIG. 4. This movement of the water will suck the water initially filling chamber 38, emptying it, and creating a pressure drop inside it. This will cause air to be sucked through opening 42, and oxygen if the additional opening 56 is open and used for this purpose. The sucked air, possibly with added oxygen, will then be sucked through channels 52 on hub 48 to mix with the water outside.

If the rotation speed of the motor is sufficiently high (for example around 2800 rpm), the air will be suitably broken up into microbubbles; so there is an optimum aeration and/or oxygenation thanks to the high air/water contact surface thus obtained.

Depending on the orientation and on the depth given to the operative unit 30, it is possible to obtain all of the desired effects described above. This is accomplished using a water treatment device that is extremely simple, strong, of long service-life, easy to use even by unskilled personnel, and simple and cost-effective to maintain.

In a constructional variant, the equipment may include an external screen around the propeller area. The screen would be preferably made of a meshed material, to create a physical protection barrier.

In conclusion, disclosed herein is a water treatment equipment 10, including a floating structure 12 that supports, submerged in the water at an adjustable depth, an operative unit 30. Unit 30 includes a propeller 50 driven by an electric motor or by a corresponding fluidic motor, and a decompression chamber 38 having at least one air inlet 42 connected to a suction pipe 24, 26 that emerges above the open surface of the water. The decompression chamber also has an air outlet 46. The orientation of this operative unit 30 can be adjusted in the vertical plane; the propeller 50 is completely outside the decompression chamber 38, the hub 48 of the propeller 50 is hollow and communicates with, also the outlet 46 of the decompression chamber 38 and ambient. A conventional rotating seal device ensures there is a seal between the hub 48 and the fixed part of the operative unit.

The operative unit 30 is borne by the floating structure 12 by means of at least one support pipe 26, 28 that also serves as a suction pipe. This pipe 26, 28 therefore has one end 44 that must always stick out above the open surface of the water in the basin.

The floating structure 12 is composed of two parallel hollow floats 14, 16 connected to each other by a horizontal platform 18 formed in a single piece with the floats 14, 16.

There are two support pipes 26, 28 in an "L" shape, whose respective upright arms 22, 24 can slide simultaneously in a vertical direction relative to the floating structure 12, the L-shaped pipes 26, 28 being able to be locked in position relative to the floating structure 12 so they sink by the desired amount.

The decompression chamber 38 contains another opening 56 that may be connected to a flexible pipe to feed oxygen or to introduce disinfectants, medicines, and similar substances.

The motor of the operative unit 30 is the type that works in an oil bath.

An external screen is applied around the propeller area, the screen preferably being made of a meshed material, to create a physical protection barrier.

The materials used to make the equipment are rust-proof.

I claim:

1. A water treatment device comprising:
   a floating structure;
   an operative unit comprised of a propeller and a motor, said motor acting to drive said propeller;
   a decompression chamber, said decompression chamber defining an air inlet and an air outlet, said propeller being located outside said decompression chamber and connected to the decompression chamber air outlet through a hollow hub; and
   a suction pipe having a substantially horizontal portion and a substantially vertical portion attached to said air inlet and extending through and attached to said floating structure, wherein said operative unit is connected to said suction pipe in such a manner that the operative unit revolves about the suction pipe permitting angular adjustment in a vertical plane on said suction pipe.

2. The device of claim 1 wherein said floating structure is comprised of two parallel hollow floats and a horizontal platform, said horizontal platform connecting said hollow floats, said hollow floats and said horizontal platform being manufactured in a single piece.

3. The device of claim 1 wherein said suction pipe is comprised of two pipes, each formed in the shape of an L, an upright portion of said pipes extending at right angles with respect to said floating structure and being slidingly connected thereto.

4. The device of claim 1 wherein said decompression chamber contains an opening for connection to a pipe for introduction of oxygen, disinfectants, medicines and other materials.

5. The device of claim 1 wherein said motor is operable in an oil bath.

6. The device of claim 1 further comprising an external screen which is applied around the propeller area, screen being made of a meshed material to create a physical protection barrier for said propellers.

7. The device of claim 1 wherein at least some portions of said device are comprised of rust proof materials.

* * * * *

UNITED STATES PATENT AND TRADEMARK OFFICE
CERTIFICATE OF CORRECTION

PATENT NO. : 5,354,457
DATED : October 11, 1994
INVENTOR(S) : Silvano Becchi

It is certified that error appears in the above-indentified patent and that said Letters Patent is hereby corrected as shown below:

On the title page, left-hand side, the application number should be changed from "328,253" to --028,253--.

Signed and Sealed this

Twentieth Day of December, 1994

Attest:

BRUCE LEHMAN

*Attesting Officer*   *Commissioner of Patents and Trademarks*